United States Patent
Bae et al.

(10) Patent No.: US 8,611,950 B2
(45) Date of Patent: Dec. 17, 2013

(54) APPARATUS AND METHOD FOR POWER SCANNING IN MOBILE COMMUNICATION TERMINAL WITH DUAL SIM CARD

(75) Inventors: Byung-Joo Bae, Gyeonggi-do (KR); Hyun-Chul Park, Gyeonggi-do (KR); Dong-Sook Park, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 449 days.

(21) Appl. No.: 12/763,319

(22) Filed: Apr. 20, 2010

(65) Prior Publication Data

US 2010/0273524 A1    Oct. 28, 2010

(30) Foreign Application Priority Data

Apr. 24, 2009  (KR) ................ 10-2009-0035845

(51) Int. Cl.
*H04M 1/00* (2006.01)
(52) U.S. Cl.
USPC ............ 455/552.1; 455/161.1; 455/558; 455/434; 455/551; 370/338; 370/328
(58) Field of Classification Search
USPC ............ 455/127.4, 127.5, 160.1, 161, 343.2, 455/343.3, 343.4, 432.1, 434, 435.1, 435.2, 455/435.3, 436, 515, 522, 550.1, 552.1, 455/553.1, 556.1, 556.2, 557, 558, 574; 370/311, 318, 322, 328, 331, 332, 338; 345/10, 96, 98, 100, 629, 211, 204
See application file for complete search history.

(56) References Cited

U.S. PATENT DOCUMENTS

| | | | |
|---|---|---|---|
| 4,460,897 A * | 7/1984 | Gans | 343/754 |
| 5,778,322 A * | 7/1998 | Rydbeck | 455/558 |
| 6,356,769 B1 * | 3/2002 | Vehmas et al. | 455/551 |
| 7,366,542 B2 * | 4/2008 | Schmidt | 455/558 |
| 7,738,846 B2 * | 6/2010 | Kaaja et al. | 455/161.1 |
| 7,940,932 B2 * | 5/2011 | Paksoy et al. | 380/247 |
| 2005/0096087 A1 * | 5/2005 | Kim | 455/558 |
| 2008/0130535 A1 * | 6/2008 | Shorty et al. | 370/310 |
| 2009/0131054 A1 * | 5/2009 | Zhang | 455/436 |
| 2009/0156257 A1 * | 6/2009 | Shi | 455/558 |
| 2010/0304782 A1 * | 12/2010 | Chang et al. | 455/552.1 |
| 2011/0077003 A1 * | 3/2011 | Shin | 455/434 |

* cited by examiner

*Primary Examiner* — Mahendra Patel
(74) *Attorney, Agent, or Firm* — Cha & Reiter, LLC.

(57) ABSTRACT

An apparatus and method for providing a power scanning in a terminal with two or more Radio Frequency (RF) chips are provided. The method includes selecting one RF chip from the two or more RF chips, performing the power scanning on a full band supported by the selected RF chip by using the selected RF chip, gathering a power scanning result obtained by performing the power scanning, and sharing the power scanning result gathered by using the selected RF chip with an unselected RF chip.

12 Claims, 5 Drawing Sheets

APPARATUS AND METHOD FOR POWER SCANNING IN MOBILE COMMUNICATION TERMINAL WITH DUAL SIM CARD

CLAIM OF PRIORITY

This application claims the benefit under 35 U.S.C. §119(a) of a Korean patent application filed in the Korean Intellectual Property Office on Apr. 24, 2009 and assigned Serial No. 10-2009-0035845, the entire disclosure of which is hereby incorporated by reference.

BACKGROUND OF THE INVENTION

1. Field of the Invention

The present invention relates to an apparatus and method for performing a power scanning in a mobile communication terminal having a dual Subscriber Identification Module (SIM) card. More particularly, the present invention relates to an apparatus and method for providing a power scanning that enhancing power performance and time by utilizing two Radio Frequency (RF) chips for managing respective SIM cards of a dual SIM card in a mobile communication terminal.

2. Description of the Related Art

Dual Subscriber Identification Module (SIM) phones have been developed to allow users to manage and use two phone numbers via one mobile terminal in a Global System for Mobile Communications (GSM)/General Packet Radio Service (GPRS)/Enhanced Data Rates for Global Evolution (EDGE) mobile phones. By utilizing a dual SIM phone with two SIM cards, the performance can be improved when compared to the conventional single SIM phone.

In operation, the above terminal performs the power scanning for each band supported by the terminal when power is on. That is, the terminal scans signals of neighbor cells for each band supported by the terminal. By using a power scanning result, the terminal can select a cell capable of receiving a service with best quality.

FIG. 1 illustrates a conventional method of power scanning in a mobile communication terminal with a dual SIM card.

Referring to FIG. 1, a terminal 100 with two SIM cards includes two Radio Frequency (RF) chips 101 and 102 for managing the respective SIM cards. Respective Radio Resource (RR) layers of the two RF chips 101 and 102 transmit power scanning request messages to corresponding Layer 1 (L1) layers. The respective L1 layers of the two RF chips 101 and 102 perform power scanning on a full band (e.g., 850 MHz, 900 MHz, 1800 MHz, and 1900 MHz) supported by the RF chips 101 and 102, gather a power scanning result according to the receive signal strength level, and transmit the scanning result to corresponding RR layers using a power scanning indication message. Accordingly, the respective RR layers of the two RF chips 101 and 102 can utilize the power scanning result during a cell selection process.

The above power scanning process must be performed in order for the terminal to acquire a normal service. However, the power scanning mode consumes the most power among all processes of the terminal, and in case of a quad-band phone supporting up to four bands, a longer time is required for the process. In case of the dual SIM phone, the power required to transmit a power scanning request message by the respective RR layers of the two RF chips to corresponding L1 layers is as twice as that of a single SIM phone. In addition, in case of the dual SIM phone, the time required to perform the power scanning is equal to that of the single SIM phone only if it is assumed that the two RF chips perform simultaneously during the power scanning.

SUMMARY OF THE INVENTION

An aspect of the present invention is to solve at least the above-mentioned problems and/or disadvantages and to provide at least the advantages described below. Accordingly, an aspect of the present invention is to provide an apparatus and method for providing a power scanning in a mobile communication terminal with a dual Subscriber Identification Module (SIM) card.

Another aspect of the present invention is to provide an apparatus and method for providing a power scanning capable of performance improvement in terms of power and time by utilizing two Radio Frequency (RF) chips for managing respective SIM cards in a mobile communication terminal with a dual SIM card.

Another aspect of the present invention is to provide an apparatus and method for performing a power scanning by using only one RF chip, and for sharing a scanning result obtained by performing the power scanning with the other RF chip in a mobile communication terminal with a dual SIM card.

Another aspect of the present invention is to provide an apparatus and method for performing a power scanning by using two RF chips and for sharing a power scanning result obtained by performing the power scanning in a mobile communication terminal with a dual SIM card. To this end, a full band supported by the terminal is allocated to each RF chip by halving the full band, and the power scanning simultaneously is performed by using a specific RF chip with respect to a band allocated to each RF chip.

In accordance with an aspect of the present invention, a method of providing a power scanning in a terminal with two or more RF chips includes: selecting one RF chip from the two or more RF chips, performing power scanning on a full band supported by the selected RF chip by using the selected RF chip, gathering a power scanning result obtained by performing the power scanning, and sharing the power scanning result gathered by using the selected RF chip with an unselected RF chip.

In accordance with another aspect of the present invention, a method of providing a power scanning in a terminal with two or more RF chips includes: classifying a full band supported by the terminal into a specific number of groups, where the specific number corresponds to the number of RF chips included in the terminal, allocating the classified groups to the respective RF chips, for each RF chip, performing the power scanning on a band in a group allocated to a specific RF chip, for each RF chip, gathering a power scanning result obtained by performing the power scanning, and sharing the gathered power scanning result for each RF chip.

In accordance with another aspect of the present invention, an apparatus for providing a power scanning in a terminal with two or more RF chips includes: a power scanning controller for selecting one RF chip from the two or more RF chips, for instructing the selected RF chip to perform the power scanning on a full band supported by the selected RF chip, and for sharing the power scanning result provided from the selected RF chip with an unselected RF chip, and an RF chip for performing the power scanning on the full band supported by the specific RF chip itself under the instruction of the power scanning controller, for gathering a power scanning result obtained by performing the power scanning, and for providing the gathered power scanning result to the power scanning controller.

In accordance with another aspect of the present invention, an apparatus for power scanning in a terminal with two or more RF chips includes: a controller for classifying a full band supported by the terminal into a specific number of groups, where the specific number corresponds to the number of RF chips included in the terminal, for allocating the classified groups to the respective RF chips, for instructing each RF chip to perform the power scanning on a band in a group allocated to a specific RF chip, and for sharing a power scanning result provided from each RF chip, and an RF chip for performing the power scanning on the band in the group allocated to the specific RF chip itself under the instruction of the power scanning controller, for gathering a power scanning result obtained by performing the power scanning, and for providing the gathered power scanning result to the power scanning controller.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

DETAILED DESCRIPTION OF THE INVENTION

Exemplary embodiments of the present invention will be described below with reference to the accompanying drawings. For the purposes of clarity and simplicity, well-known functions or constructions are not described in detail as they would obscure the invention in unnecessary detail.

Hereinafter, an apparatus and method for providing a power scanning in a mobile communication terminal with a dual Subscriber Identification Module (SIM) card will be described.

A power scanning result obtained by performing the power scanning of the terminal is dependent on a location of the terminal and capability of a Radio Frequency (RF) chip. Here, if it is assumed that respective RF chips of the terminal with the dual SIM card have the same power scanning capability, the power scanning result may differ depending on only the location of the terminal. However, since two RF chips are included in the terminal with the dual SIM card, it may be said that each RF chip experiences almost the same surrounding radio environment.

The conventional method has a problem in that the two RF chips located in the same position perform repeated power scanning to acquire a normal service of the terminal with the dual SIM card. That is, a power scanning request message is repetitively transmitted for the same purpose, and as a result, power consumption is two times higher than that of a terminal with a single SIM card.

To solve this problem, the present invention provides a method of performing a power scanning using only one RF chip in the mobile communication terminal with the dual SIM card, and for sharing a power scanning result obtained by performing the power scanning with the other RF chip. Alternatively, the present invention also provides a method for performing a power scanning by using two RF chips and for sharing a power scanning result obtained by performing the power scanning in a mobile communication terminal with a dual SIM card, wherein the method allocates a full band supported by the terminal to each RF chip by separating the full band, then simultaneously performs the power scanning using a respective RF chip with respect to the band that is allocated to each RF chip.

Figure 1:
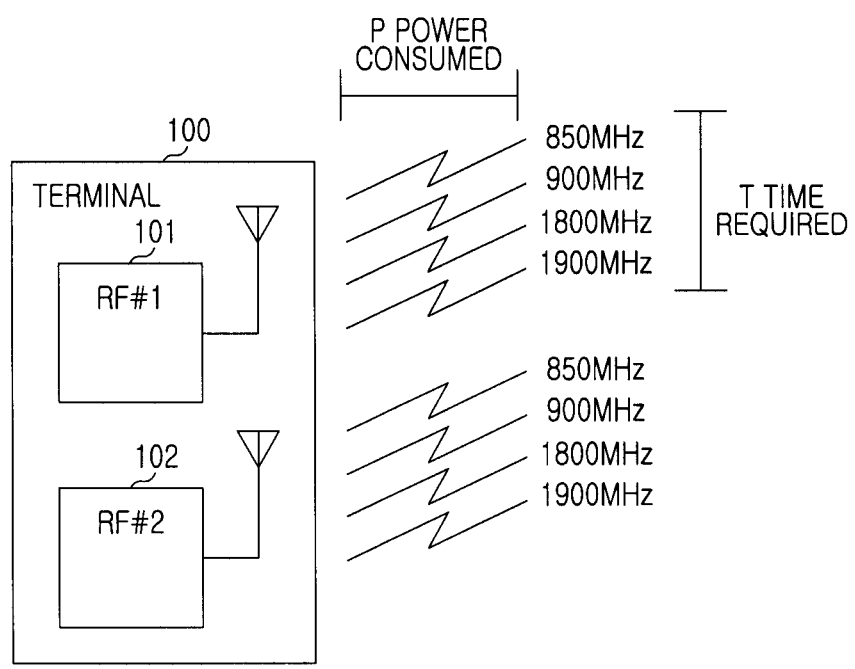
FIG. 1 illustrates a conventional method of power scanning in a mobile communication terminal with a dual Subscriber Identification Module (SIM) card.
Figure 2:
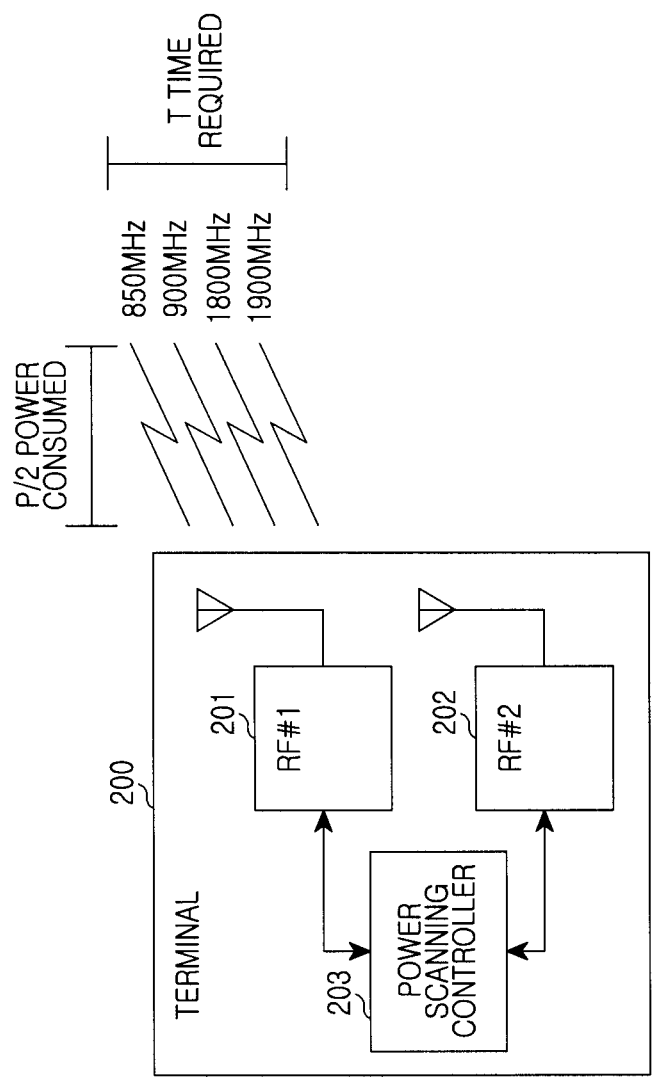
FIG. 2 is a block diagram illustrating a structure of a power scanning apparatus for performing a power scanning by using only one Radio Frequency (RF) chip, and for sharing a power scanning result obtained by performing the power scanning with the other RF chip in a mobile communication terminal with a dual SIM card according to a first exemplary embodiment of the present invention.

FIG. 2 is a block diagram illustrating the structure of a power scanning apparatus for performing power scanning using only one RF chip and for sharing a power scanning result with another RF chip in a mobile communication terminal with a dual SIM card according to a first exemplary embodiment of the present invention.

Referring to FIG. 2, a terminal 200 with two SIM cards includes two RF chips 201 and 202 for managing the respective SIM cards and a power scanning controller 203.

The power scanning controller 203 selects one RF chip 201 between the two RF chips 201 and 202 when the terminal 200 is powered on, and instructs the selected RF chip 201 to perform the power scanning on a full band supported by the RF chip 201.

As a result, the selected RF chip 201 performs power scanning on the full band supported by the RF chip 201 under the instruction of the power scanning controller 203, and gathers a power scanning result, and provides the gathered result to the power scanning controller 203. More specifically, a Radio Resource (RR) layer of the selected RF chip 201, for example, transmits a power scanning request message to a corresponding L1 layer so as to request to perform the power scanning. In this case, the L1 layer performs the power scanning on the full band (e.g., 850 MHz, 900 MHz, 1800 MHz, and 1900 MHz) supported by the RF chip 201, gathers a power scanning result obtained by performing the power scanning according to strongest received signal strength, and transmits the gathered result to the RR layer by using a power scanning indication message.

The power scanning controller 203 shares the power scanning result provided from the selected RF chip 201 with the unselected RF chip 202 between the two RF chips. Accordingly, respective RR layers of the two RF chips 201 and 202 may utilize the power scanning result of the selected RF chip 201 during a cell selection process. Therefore, a power consumption may be reduced by half in comparison with the conventional method in which each RF chip separately performs power scanning.

Figure 3:
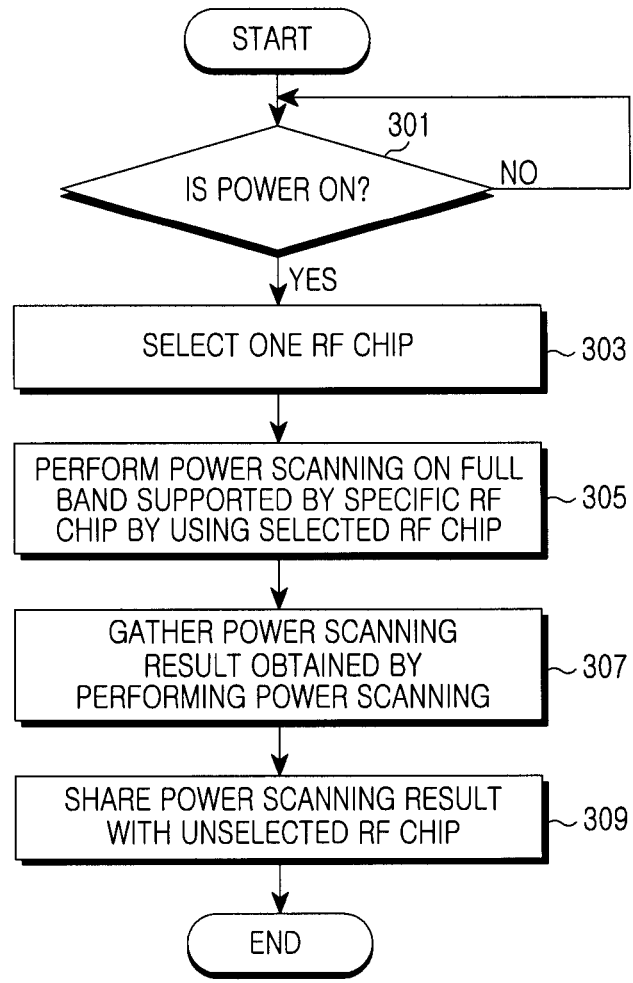
FIG. 3 is a flowchart illustrating a power scanning method for performing a power scanning by using only one RF chip, and for sharing a power scanning result obtained by performing the power scanning with the other RF chip in a mobile communication terminal with a dual SIM card according to the first exemplary embodiment of the present invention.

FIG. 3 is a flowchart illustrating a power scanning method for performing power scanning by using only one RF chip and for sharing the power scanning result according to the first exemplary embodiment of the present invention.

Referring to FIG. 3, the terminal determines whether power is on in step 301.

If power-on is detected in step 301, the terminal selects one RF chip between two RF chips in step 303.

By using the selected RF chip, the terminal performs the power scanning on a full band supported by the selected RF chip in step 305, and gathers a power scanning result obtained by performing the power scanning in step 307. For example, if the selected RF chip supports four bands of 850 MHz, 900 MHz, 1800 MHz, and 1900 MHz, the terminal performs the power scanning on the four bands.

In step 309, the terminal shares the power scanning result gathered by using the selected RF chip with the unselected RF chip between the two RF chips.

Thereafter, the procedure of FIG. 3 ends.

Figure 4:
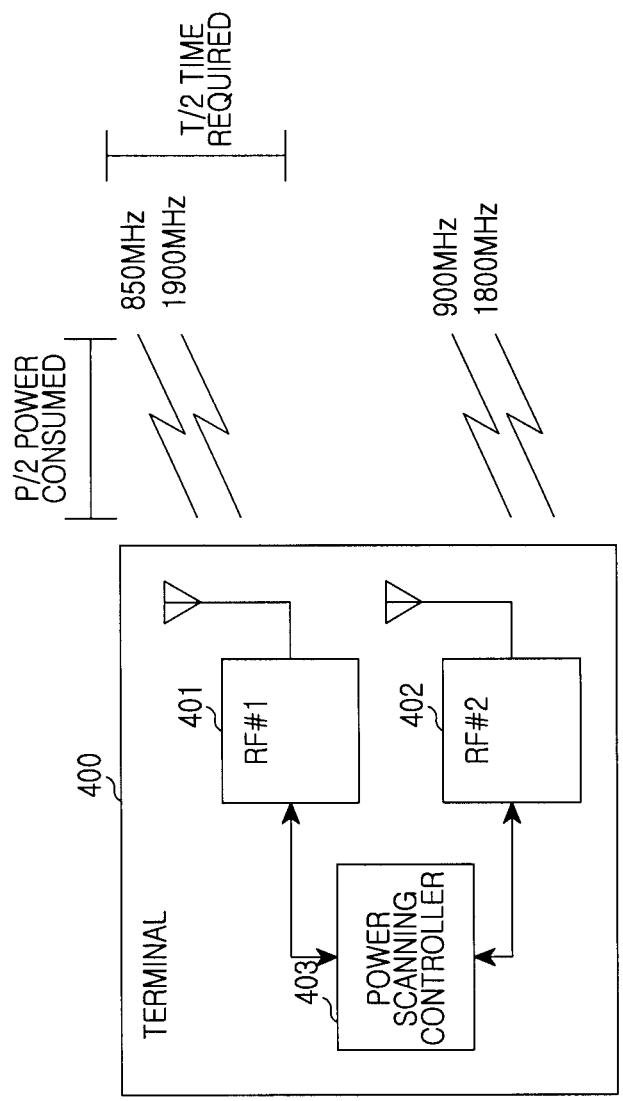
FIG. 4 is a block diagram illustrating a structure of a power scanning apparatus for performing a power scanning by using two RF chips, and for sharing a scanning result obtained by performing the power scanning in a mobile communication terminal with a dual SIM card according to a second exemplary embodiment of the present invention.

FIG. 4 is a block diagram illustrating the structure of a power scanning apparatus for performing a power scanning using respective RF chips and for sharing a scanning result according to a second exemplary embodiment of the present invention. In the second embodiment, the terminal allocates a full band supported by the terminal to each RF chip by dividing the full band into two for power scanning, then simultaneously performs the power scanning with respect to a band allocated to each RF chip.

Referring to FIG. 4, a terminal 400 with two SIM cards includes two RF chips 401 and 402 for managing the respective SIM cards and a power scanning controller 403.

The power scanning controller 403 classifies a full band supported by the two RF chips 401 and 402 into two (that is, number corresponds to the number of RF chips included in the terminal) groups when the terminal is powered on, allocates the classified groups to the respective RF chips 401 and 402, and instructs each of the RF chips 401 and 402 to perform the power scanning with respect to the band allocated to the respective RF chips 401 and 402.

For example, when each RF chip supports four bands of 850 MHz, 900 MHz, 1800 MHz, and 1900 MHz, the power scanning controller 403 classifies the four bands into two groups, one bands of 850 MHz and 1900 MHz and another bands of 900 MHz and 1800 MHz, then instructs one RF chip 401 to perform the power scanning on the bands of 850 MHz and 1900 MHz and the second RF chip 402 to perform the power scanning on the two bands of 900 MHz and 1800 MHz.

Each of the RF chips 401 and 402 performs power scanning on the bands in the groups allocated to the respective RF chips 401 and 402 under the instruction of the power scanning controller 403, and gathers a power scanning result, and provides the gathered result to the power scanning controller 403. More specifically, an RR layer of each of the RF chips 401 and 402 transmits a power scanning request message to a corresponding L1 layer so as to request to perform a power scanning on the bands in the groups allocated to the respective RF chips 401 and 402. In this case, the L1 layer of each of the RF chips 401 and 402 performs a power scanning on the bands in the groups allocated to the respective RF chips 401 and 402, gathers a power scanning result obtained by performing the power scanning according to strongest received signal strength, and transmits the gathered result to the RR layer by using a power scanning indication message.

The power scanning controller 403 shares a power scanning result provided from each of the RF chips 401 and 402. Accordingly, respective RR layers of the two RF chips 401 and 402 may utilize the shared power scanning result obtained for each of the RF chips 401 and 402 during a cell selection process. As a result, in comparison with the conventional method in which each RF chip separately performs the power scanning, a power consumption may be reduced by half and a required time is also reduced by half.

Figure 5:
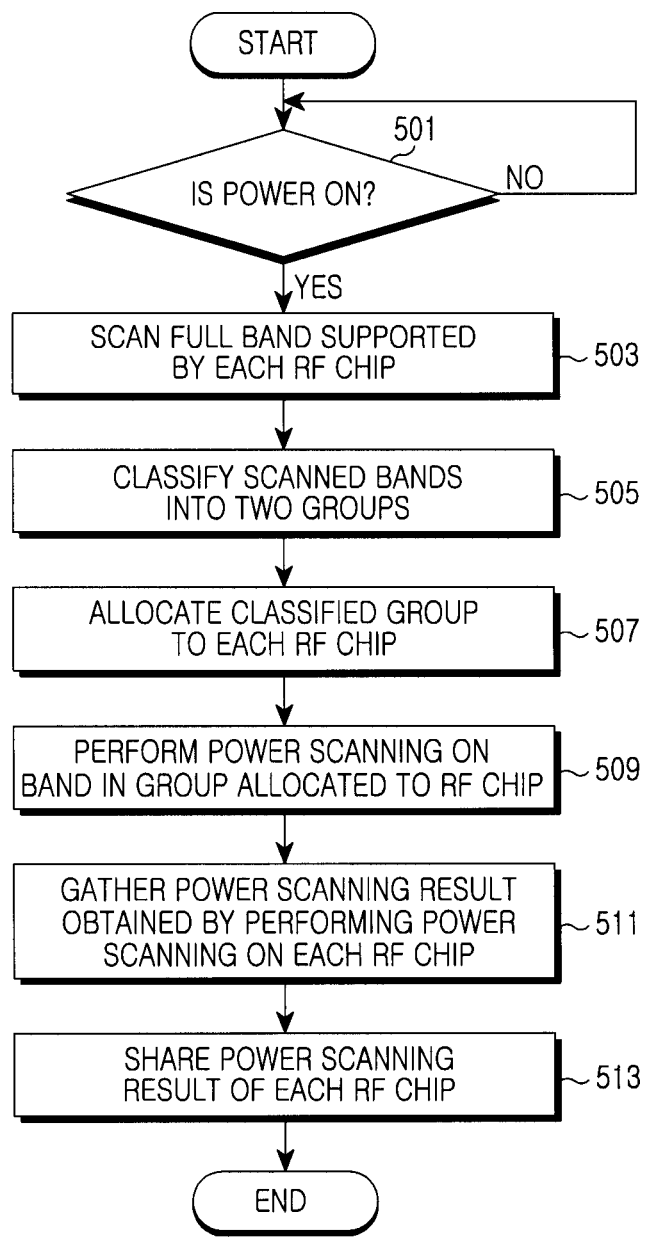
FIG. 5 is a flowchart illustrating a power scanning method for performing power scanning by using two RF chips, and for sharing a scanning result obtained by performing the power scanning in a mobile communication terminal with a dual SIM card according to the second exemplary embodiment of the present invention.

FIG. 5 is a flowchart illustrating a power scanning method for performing a power scanning by using two RF chips, and for sharing a scanning result obtained by performing the power scanning in a mobile communication terminal with a dual SIM card according to the second exemplary embodiment of the present invention.

Referring to FIG. 5, the terminal determines whether power is on in step 501.

If power-on is detected in step 501, the terminal searches a full band supported by each RF chip in step 503. That is, a full band supported by the terminal is searched. For example, if each RF chip supports four bands of 850 MHz, 900 MHz, 1800 MHz, and 1900 MHz, the full band supported by the terminal corresponds to the four bands.

The terminal classifies the searched band into two (that is, number corresponds to the number of RF chips included in the terminal) groups in step 505, and allocates the classified groups to the respective RF chips in step 507. In the above example, the four bands may be classified into two bands of 850 MHz and 1900 MHz and two bands of 900 MHz and 1800 MHz. The two bands of 850 MHz and 1900 MHz may be allocated to one RF chip, and the two bands of 900 MHz and 1800 MHz may be allocated to the remaining RF chip.

The terminal performs the power scanning on the bands in the groups allocated to the respective RF chips in step 509, and gathers a power scanning result obtained by performing the power scanning for each RF chip in step 511.

In step 513, the terminal shares the power scanning result of each RF chip.

Thereafter, the procedure of FIG. 5 ends.

Having thus described embodiments of a method for providing a power scanning in a mobile communication system, it should be apparent to those skilled in the art that certain advantages of the system have been achieved. The foregoing is to be constructed as only being an illustrative embodiment of this invention. Persons skilled in the art can easily conceive of alternative arrangements providing a functionality similar to this embodiment without any deviation from the fundamental principles or the scope of this invention. For example, although band ranges of 850 MHz, 900 MHz, 1800 MHz, and 1900 MHz are used for illustrative purposes, it should be noted that the teachings of the present invention may be applied to other range of frequency band.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. As would be recognized by those skilled in the art, when a general purpose computer is loaded with, or accesses, software or code for implementing the processing shown herein, the general purpose computer is transformed into a special purpose computer that may at least perform the processing shown herein. In addition, the computer, processor or dedicated hardware may be composed of at least one of a single processor, a multi-processor, and a multi-core processor.

While the present invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. A method of providing a power scanning in a multi-band terminal with two or more Radio Frequency (RF) chips, the method comprising:
   selecting only one RF chip from the two or more RF chips in the terminal;
   performing the power scanning on a full band comprising a plurality of individual frequency bands supported by the terminal, using only the selected RF chip, wherein the power scanning measures receive signal strength levels to select a cell for communication; and
   sharing a power scanning result gathered by the selected RF chip with an unselected RF chip of the two or more RF chips in the terminal,
   wherein the terminal comprises two or more Subscriber Identification Module (SIM) cards, and wherein the two or more RF chips respectively manage the two or more SIM cards, and wherein each RF chip supports all of the individual frequency bands supported by the terminal.

2. The method of claim 1, wherein the full band supported by the terminal includes 850 MHz, 900 MHz, 1800 MHz, and 1900 MHz individual bands.

3. A method of providing a power scanning in a multi-band terminal with two or more Radio Frequency (RF) chips, the method comprising:
   classifying a full band comprising a plurality of individual frequency bands supported by the terminal into a specific number of groups of bands, where the specific number corresponds to the number of RF chips included in the terminal;
   allocating the classified groups to the respective RF chips;
   performing, by each RF chip in the terminal, the power scanning only on the respective allocated band group, wherein the power scanning measures receive signal strength levels to select a cell for communication; and
   sharing a gathered power scanning result of the power scanning by each RF chip between each RF chip of the two or more RF chips in the terminal,
   wherein the terminal comprises two or more Subscriber Identification Module (SIM) cards, and wherein the two or more RF chips respectively manage the two or more SIM cards, and wherein each RF chip supports all of the individual frequency bands supported by the terminal.

4. The method of claim 3, wherein a first group of bands supported by the terminal includes 850 MHz and 1900 MHz bands and a second group of bands supported by the terminal includes 900 MHz and 1800 MHz bands.

5. The method of claim 4, wherein the power scanning of the first group is performed by a first RF chip.

6. The method of claim 4, wherein the power scanning of the second group is performed by a second RF chip.

7. An apparatus for providing a power scanning in a multi-band terminal, the apparatus comprising:
   a plurality of Radio Frequency (RF) chips for performing the power scanning in the terminal, wherein the power scanning measures receive signal strength levels to select a cell for communication; and
   a power scanning controller for selecting only one RF chip from the two or more RF chips, for instructing the selected RF chip to perform the power scanning on a full band comprising a plurality of individual frequency bands supported by the terminal, and for sharing the power scanning result with an unselected RF chip of the two or more RF chips in the terminal,
   wherein the terminal comprises two or more Subscriber Identification Module (SIM) cards, and wherein the two or more RF chips respectively manage the two or more SIM cards, and wherein each RF chip supports all of the individual frequency bands supported by the terminal.

8. The apparatus of claim 7, wherein the full band supported by the terminal includes 850 MHz, 900 MHz, 1800 MHz, and 1900 MHz bands.

9. An apparatus for power scanning in a multi-band terminal with two or more Radio Frequency (RF) chips, the apparatus comprising:
   a plurality of Radio Frequency (RF) chips arranged in the terminal for performing the power scanning, wherein the power scanning measures receive signal strength levels to select a cell for communication; and
   a controller for classifying a full band comprising a plurality of individual bands supported by the terminal into a specific number of groups of bands, where the specific number corresponds to the number of RF chips included in the terminal, for allocating the classified groups to the respective RF chips, for instructing each RF chip to perform the power scanning only on the allocated band group, and for sharing a power scanning result of the power scanning by each RF chip between each RF chip of the two or more RF chips in the terminal,
   wherein the terminal comprises two or more Subscriber Identification Module (SIM) cards, and wherein the two or more RF chips respectively manage the two or more SIM cards, and wherein each RF chip supports all of the individual frequency bands supported by the terminal.

10. The apparatus of claim 9, wherein a first group of bands supported by the terminal includes 850 MHz and 1900 MHz bands and a second group of bands supported by the terminal includes 900 MHz and 1800 MHz bands.

11. The apparatus of claim 10, wherein the power scanning of the first group is performed by a first RF chip.

12. The apparatus of claim 10, wherein the power scanning of the second group is performed by a second RF chip.

* * * * *